United States Patent [19]

Robinson

[11] 3,840,700

[45] Oct. 8, 1974

[54] MESSAGE DISPLAY DEVICE

[76] Inventor: Gilbert A. Robinson, 2441 E. Hermosa, Tempe, Ariz. 85282

[22] Filed: Feb. 22, 1973

[21] Appl. No.: 334,748

[52] U.S. Cl. .......................... 178/7.2, 178/DIG. 30
[51] Int. Cl. .......................... H04n 5/24
[58] Field of Search ............ 178/DIG. 1, DIG. 30, 178/DIG. 38, 7.88, 7.89, 7.2; 310/232

[56] References Cited

UNITED STATES PATENTS

| | | | |
|---|---|---|---|
| 3,042,998 | 7/1962 | Sweett et al. | 310/232 |
| 3,226,476 | 12/1965 | Tyler | 178/DIG. 1 |
| 3,239,601 | 3/1966 | Keys | 178/DIG. 1 |
| 3,477,782 | 11/1969 | Sherwin | 353/40 |
| 3,752,919 | 8/1973 | Qurashi et al. | 178/7.88 |

*Primary Examiner*—Howard W. Britton
*Assistant Examiner*—Michael A. Masinick

[57] ABSTRACT

An automatic means for the sequential display of meter faces and message cards to a television camera comprising in one embodiment a rotating cylinder having display devices and message cards mounted about the periphery of its vertical cylindrical surface which display devices are moved past the field of view of the television camera as the display assembly rotates and another embodiment wherein a second cylindrical display assembly is also utilized which rotates cards mounted about the periphery of its cylindrical surface, which message cards are moved past a mirror assembly which reflects the image of the message cards into the lens of the camera. The field of view of the camera in the second embodiment includes the images of the display devices of both the first and second display assemblies showing the continuous progression of the total number of meter displays and message cards mounted on the two display assemblies.

8 Claims, 7 Drawing Figures

MESSAGE DISPLAY DEVICE

BACKGROUND OF THE INVENTION

The programming of television broadcasting, especially in the case of local stations, often includes the display of weather information including temperature, barometric pressure, wind velocity and direction along with time and advertising or other types of messages. Economy and convenience in the display of such messages has been provided by automatic equipment which is designed to display this information sequentially in a manner that is effective and pleasing to the television viewer.

DESCRIPTION OF THE PRIOR ART

Various types of equipment are available which provide automatic scanning of a series of such messages.

Such prior art equipment employs in one case a revolving message carrier which moves a large number of message cards across the field of view of the television camera. In another case, a revolving mirror scans a set of stationary meters and limited number of message cards, directing images of the individual displays sequentially to the camera field of view. Unfortunately, such prior art equipment is expensive and yet limited in flexibility. It is not possible, for example, to display with any one such prior art device a set of meter faces interspersed with a large number of message cards, nor is it possible to show these two types of displays simultaneously.

Because it is always desirable to provide any given function at a lower cost and because a higher degree of flexibility will permit more efficient utilization of television broadcasting time while adding significantly to viewer interest, there is a need for improved equipment for automatic message display.

SUMMARY OF THE INVENTION

Therefore, in accordance with the invention claimed, a new type of automatic message display equipment is provided which permits simultaneous display of meter faces and message cards on the television viewing screen. The unique design of the equipment affords a significantly higher degree of flexibility at a lower cost.

It is, therefore, one object of this invention to provide a new and improved automatic display device for television broadcasting.

Another object of the invention is to provide such an improved automatic display device which has a capability of displaying sequentially a multiplicity of meter faces indicating such data as time, temperature, barometric pressure, wind direction, wind velocity or any other such data which may be continuously monitored and displayed and which may be of interest to the television viewer.

A further object of the invention is to provide such an automatic display device which has a capability of displaying sequentially a large number of message cards.

A still further object of the invention is to provide such an automatic display device which has a capability of displaying both meter indications and message cards simultaneously or dispersed, one following the other.

A still further object of the invention is to provide such an automatic display device which provides a high degree of flexibility incorporating all of the aforementioned functions in a single piece of equipment and in a novel design permitting the production of the equipment at low cost.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
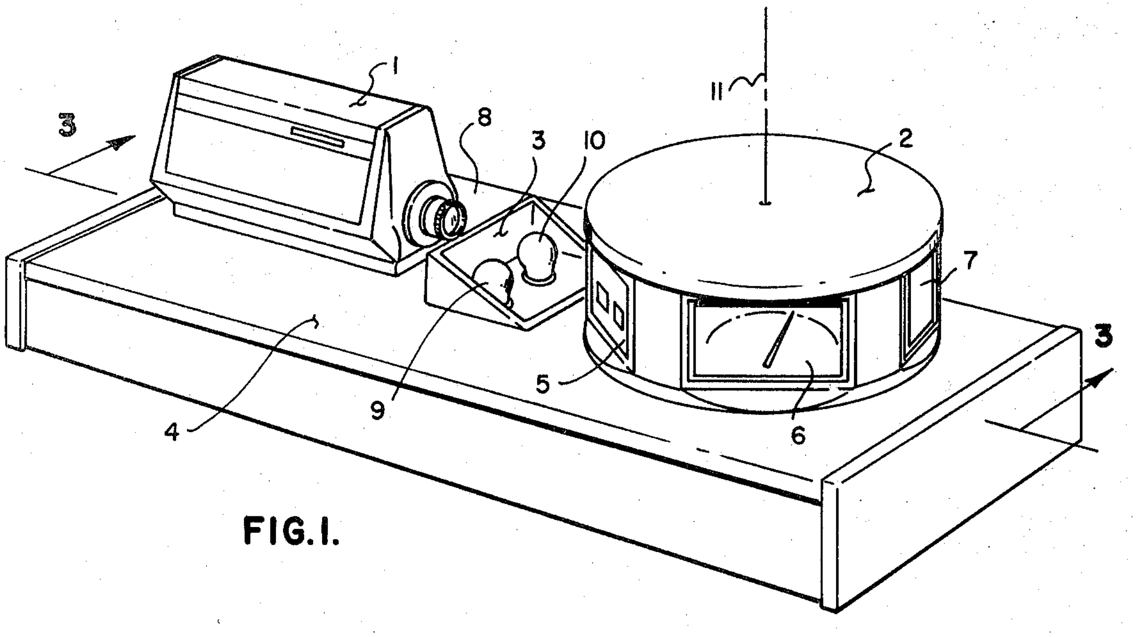
FIG. 1 is a perspective view of a first embodiment of the invention.

Referring more particularly to the drawing by characters of reference, FIG. 1 discloses a simplified version of the automatic display device including a television camera 1, a display assembly 2, an illumination assembly 3 and a frame or mounting platform 4. Television camera 1 is mounted in a fixed position on mounting platform 4. Display assembly 2 which, for example, may be in the form of a cylinder or carousel, is equipped with a number of display faces 5, 6 and 7 positioned about the periphery of the cylindrical surface of the display assembly. Additional display faces are located on the obscured portion of the cylindrical surface. The display faces 5, 6 and 7 may be the faces of meters or other indicators or they may hold message cards. The television camera lens 8 is directed toward a segment of the cylindrical surface of the display assembly 2 which is lighted by lamps 9 and 10 incorporated in illumination assembly 3. In operation, display assembly 2 rotates about its vertical axis and the individual display faces 5, 6, 7, etc. move past the illuminated field of view of the television camera 1.

Figure 2:
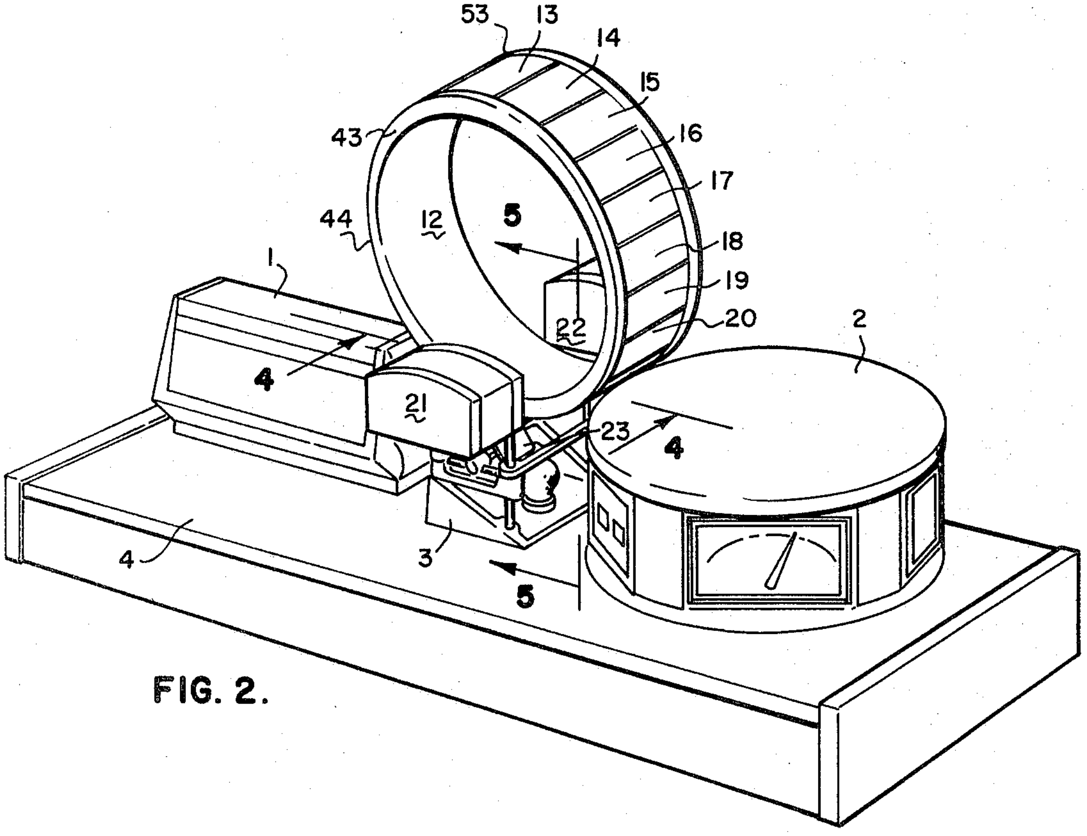
FIG. 2 is a perspective view of a second embodiment of the invention incorporating additional functions.

FIG. 2 shows a more complete form of the preferred embodiment which includes the elements shown in FIG. 1 but in addition includes a second cylindrical display assembly 12, a motor assembly 21 for rotating the second cylindrical display assembly 12, and an idler 22 which works in cooperation with motor assembly 22 in the rotation of display assembly 12. A multiplicity of display positions 13, 14, 15, 16, 17, 18, 19, 20 and others obscured from view are distributed about the outer cylindrical surface of display assembly 12 and are fashioned to hold message cards. The display assembly 12 is rotated about the horizontal axis of its cylindrical surface by motor assembly 21 and idler assembly 22 so that individual display positions 13, 14, 15, etc. are moved sequentially past a point directly over illumination assembly 3. A mirror assembly 23, partially obscured in FIG. 2, is positioned adjacent illumination assembly 3. Mirror assembly 23 is fashioned to reflect the image of the display position located directly above illumination assembly 3 and direct it into the lens of the camera 1.

Figure 3:
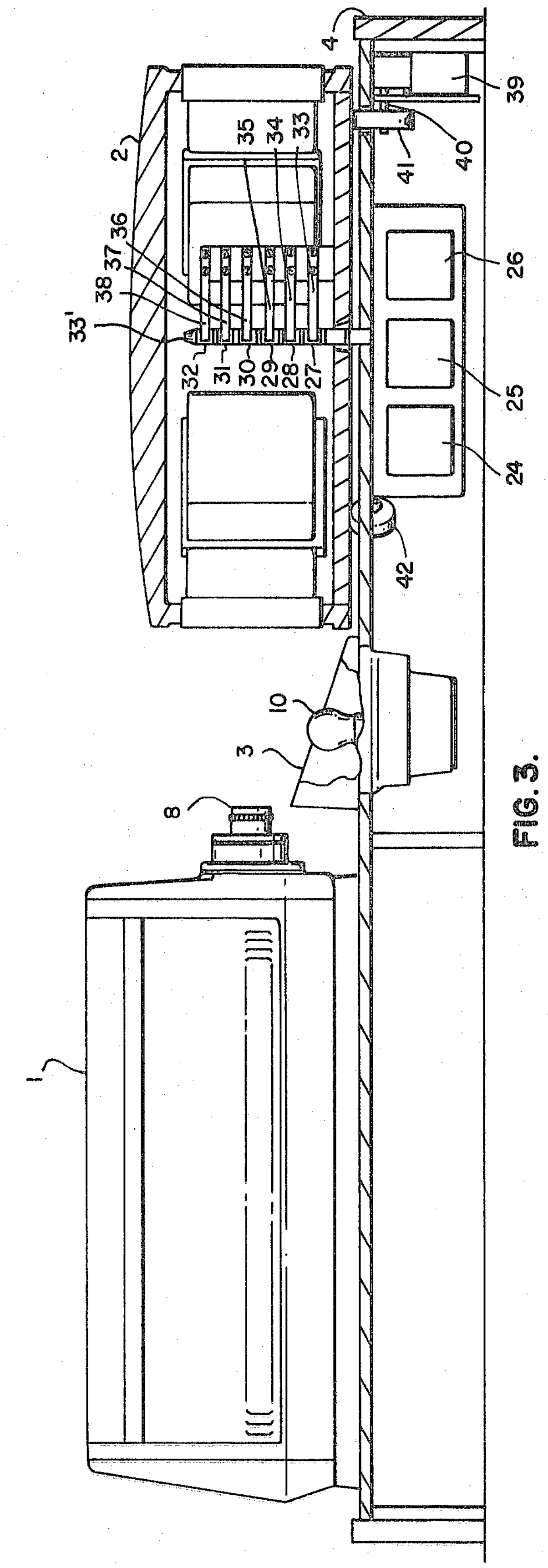
FIG. 3 shows a sectional view 3 of FIG. 1 taken along the line 3—3.

Additional details not visible in FIG. 1 are shown in the section view of FIG. 3. In FIG. 3 as well as in FIG. 1, camera 1, illumination assembly 3 and display assembly 2 are shown supported by mounting platform 4. In addition, FIG. 3 shows transducers 24, 25 and 26 located beneath the surface of mounting platform 4 and directly below display assembly 2. Transducers 24, 25 and 26 convert information defining weather conditions or other data into electric currents or potentials suitable for actuating the meters which are mounted about the outer surface of the cylindrical display assembly 2. The electric currents or potentials are dispatched to the meters by means of wires which connect the output terminals of transducers 24, 25 and 26 to commutator bands 27, 28, 29, 30, 31 and 32 located on a stationary vertical spindle 33. Spindle 33′ is a hollow spindle and the connecting wires may thus be routed from transducers output terminals through the hollow core of spindle 33′, where connections are made to commutator bands 27, 28, 29, 30, 31 and 32. Attached to the frame of the revolving display assembly 2 are metallic strips 33, 34, 35, 36, 37 and 38. These strips are made of a metallic material which is a good electrical conductor and which mechanically has the characteristic of a leaf spring. When the display assembly 2 is in place on mounting platform 4, strips 33–38 bear against mating commutator bands 27–32 so that electrical contact between corresponding bands and strips is maintained as the display assembly rotates about its axis. Strips 33–38 are connected by wires to the terminals of meters mounted in display positions 5, 6, 7, etc. located on the outer surface of display assembly 2. Motor 39 is coupled by its shaft 40 to wheel 41 which bears against the flat under surface of display assembly 2. Display assembly 2 rests on wheel 41 and on two additional wheels or idlers, one of which is shown and identified by reference character 42. Motor 39 is preferably a synchronous motor to guarantee a constant speed of rotation for display assembly 2.

Figures 4, 5, 6, 7:
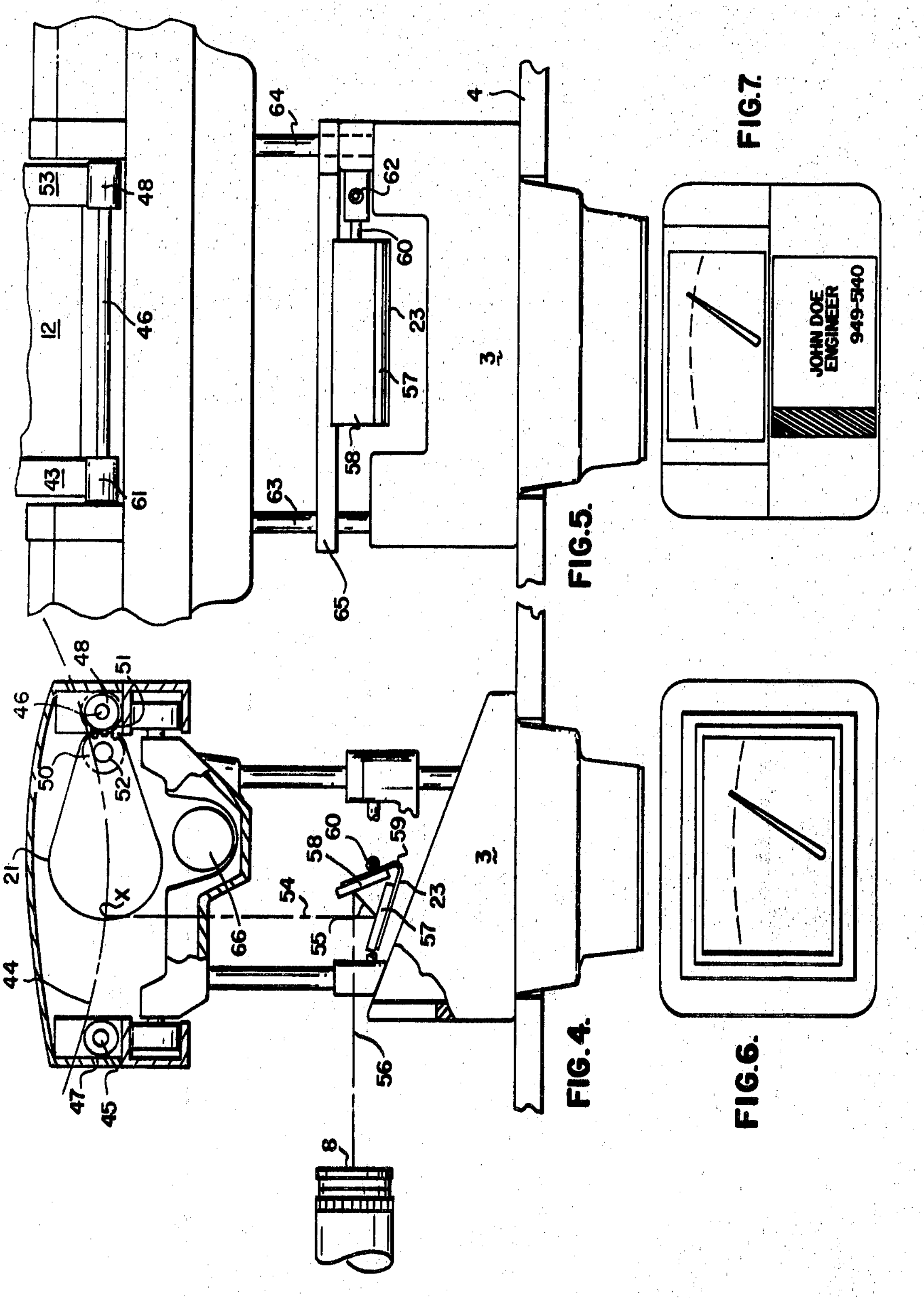
FIG. 4 shows section view 4 of FIG. 2 taken along the line 4—4.
FIG. 5 shows sectional view 5 of FIG. 2 taken along the line 5—5.
FIG. 6 shows the television camera field of view for the embodiment of the invention shown in FIG. 1.
FIG. 7 shows the television camera field of view for the embodiment of the invention shown in FIG. 2.

FIG. 4 shows in greater detail the functional parts associated with the second display assembly 12 as shown in FIG. 2. Only the outer edge 44 of rim 43 of display assembly 12 is shown in dash lines in FIG. 4. The outer surface 44 of rim 43 rests on two supporting shafts 45 and 46, each of which is fitted with rubber wheels rigidly attached at each end of the shaft and on which rest the rims of display assembly 12. Two of these rubber wheels are shown in FIG. 4 where they are identified by characters of reference 47 and 48. A gear assembly comprising gears 50 and 51 couples shaft 46 to a motor driven shaft 52 located inside motor assembly 21, shown more clearly in FIG. 2. The motor located inside motor assembly 21 is also preferably of the synchronous type to ensure a constant and steady rotation of shaft 46.

Display assembly 12 rests with its rims 43 and 53 on shafts 45 and 46. Shaft 46 is turned by motor assembly 21, while shaft 45 acts as an idler. Motor assembly 21 rotates the display assembly 12 at a constant speed about the horizontal axis of its cylindrical outer surface. Display positions 13–20, etc. are thus moved sequentially past a point identified by the character X in FIG. 4. Projection of the image of the display position passing over point X into camera lens 8 is illustrated by light beam segments 54, 55 and 56. Projection of the image is accomplished by mirror assembly 23 which includes two plane mirrors 57 and 58 supported by mirror bracket 59 at an angle relative to each other of approximately 45°. The position of mirror assembly 23 is adjustable horizontally and vertically as well as rotationally about axis 60, which is perpendicular to the plane of the drawing. When the position of the mirror assembly is properly adjusted, beam 54 strikes the surface of mirror 57 and is reflected as beam 55, which in turn strikes the surface of mirror 58 and is reflected as beam 56 into lens 8 of camera 1. The reflected paths of the light beam may be verified through the application of the well-known principle requiring that the angle of incidence is equal to the angle of reflection. The second reflection from mirror 58 corrects the "background" or "mirror image" produced by the first reflection from mirror 57. The television viewer thus sees a true or natural image of the message cards.

FIG. 5 shows additional detail involving the support of display assembly 12 and mirror assembly 23. Shaft 46 is shown with attached rubber wheels 48 and 61, on which rest the rims 43 and 53 of display assembly 12. Mirror assembly 23 is shown from a point opposite camera 1. Mirror assembly 23 rotates about shaft 60 and its rotational position is secured by set screw 62. Support posts 63 and 64 are held by illumination assembly 3 which rests on the surface of mounting platform 4.

FIG. 6 shows the field of view of camera 1 or the picture seen on the television receiver for the first embodiment of the invention as shown in FIG. 1. Only the face of meter 5, 6 or 7 mounted on display assembly 2 is visible to camera 1. Rotation of display assembly 2 causes the meter image to move from right to left on the television receiver.

FIG. 7 shows the field of view of camera 1 or the picture seen on the television for the second embodiment of the invention as shown in FIG. 2. The upper half of the field of view covers the face of the meter mounted on display assembly 2; the lower half of the field of view shows juxtapositioned thereto one of the message cards 13–20, etc. mounted on display assembly 12. As display assembly 12 rotates, the image of the message card as seen on the television receiver moves slowly upward.

In the preferred embodiment of the invention, both display assemblies 2 and 12 rotate continuously so that upper and lower images move continuously from right to left and in an upward direction respectively; the images changing continuously from one to the next adjacent display meter or message card mounted on the respective display assembly. Variations of the mode of operation including rests at each display position or synchronous stepping of display positions for the two display assemblies are included in the scope of the invention. Manual stepping of display positions is also recognized as an obvious variation. Additional applications of the invention will also be readily apparent, as the monitoring of scientific experiments as in the case of space flights when rocket engine performance indications are monitored and displayed at a control console.

In order to more clearly separate the two fields of view shown on the picture seen on television, bar 65 is mounted on and between support parts 63 and 64. This bar is seen by the camera and divides the picture into two segments.

Since it may be necessary to increase the illumination of the second display assembly over that possible with lamps 9 and 10, a further lamp 66 may be mounted directly below it, as shown in FIG. 4.

Although but two embodiments of the present invention have been illustrated and described, it will be apparent to those skilled in the art that various changes and modifications may be made therein without departing from the spirit of the invention or from the scope of the appended claims.

What is claimed is:

1. A message display device comprising in combination:

a frame, a display assembly rotatably mounted on said frame for presenting sequentially its display surfaces to a television camera mountable on said frame, at least one electrically energized information display meter mounted on said display assembly, a spindle fixedly mounted on said frame about which said display assembly is rotatably mounted, at least one commutator band mounted around said spindle, means for electrically energizing said commutator band, means connected to said meter for engaging said commutator band for energizing said meter, and means for rotating said display assembly.

2. The message display device set forth in claim 1 wherein:

said means connected to said meter rubs on said commutator band.

3. The message display device set forth in claim 1 wherein:

a plurality of electrically energized information display meters are spacedly arranged around the periphery of said display assembly, a plurality of commutator bands are mounted on said spindle each electrically insulated from the other, said spindle comprises a hollow tubular configuration having means for electrically energizing said commutator bands extending into the hollow tubular configuration of said spindle, means for electrically energizing each of said commutator bands with different signals, and means connected to each of said meters for engaging a different one of said commutator bands.

4. The message device set forth in claim 3 wherein:

said means for rotating said display assembly comprises an electric synchronous motor mounted on said frame.

5. The message device set forth in claim 4 wherein:

said means for rotating said display assembly comprises a drive wheel, the outer circumference of which engages one end of said display assembly for rotating said display assembly about said spindle, at least two idler rollers mounted on said frame for supporting said display assembly and aiding its rotation about said spindle under the influence of said drive roller, and a light for illuminating said display surfaces as they rotate into view of said camera.

6. A message display device comprising, in combination:

a frame, a first display assembly rotatably mounted on said frame for presenting sequentially its display surfaces to a television camera mountable on said frame, at least one electrically energized information display meter mounted on said display assembly, a spindle fixedly mounted on said frame about which said display assembly is rotatably mounted, at least one commutator band mounted around said spindle, means for electrically energizing said commutator band, means connected to said meter for engaging said commutator band for energizing said meter, a second display assembly rotatably mounted on said frame for presenting sequentially its display surfaces to a mirror assembly, a mirror assembly mounted on said frame for receiving images of said display surfaces of said second display assembly and transmitting them as real images to said camera juxtapositioned to the images received by the display surfaces of said first display assembly, and means for rotating said first and second display assemblies.

7. The message display device set forth in claim 6 wherein:

a plurality of electrically energized information display meters are spacedly arranged around the periphery of said first display assembly, a plurality of commutator bands are mounted on said spindle each electrically insulated from the other, and said spindle comprises a hollow tubular configuration having means for electrically energizing said commutator bands extending into the hollow tubular configuration of said spindle, means for electrically energizing each of said commutator band with different signals, means connecting to each of said meters for energizing a different one of said commutator bands, and said second display device comprising a plurality of display surfaces.

8. The message device set forth in claim 7 wherein:

said means for rotating said first and second display assemblies comprise a pair of electric synchronous motors mounted on said frame.

* * * * *